(12) United States Patent
Kawai et al.

(10) Patent No.: US 9,178,380 B2
(45) Date of Patent: Nov. 3, 2015

(54) CHARGER APPARATUS CAPABLE OF DETERMINING DETERIORATION OF SECOND BATTERY

(75) Inventors: Akira Kawai, Shiga (JP); Masaki Ikeda, Shiga (JP); Masaaki Sakaue, Shiga (JP); Toshiharu Ohashi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 502 days.

(21) Appl. No.: 13/606,524

(22) Filed: Sep. 7, 2012

(65) Prior Publication Data

US 2013/0063079 A1    Mar. 14, 2013

(30) Foreign Application Priority Data

Sep. 12, 2011 (JP) .................. 2011-198279

(51) Int. Cl.
  H02J 7/00 (2006.01)
  H02J 7/04 (2006.01)
(52) U.S. Cl.
  CPC ............... *H02J 7/045* (2013.01); *H02J 7/0047* (2013.01)
(58) Field of Classification Search
  CPC ..... H02J 7/007; H02J 7/0021; G01R 31/3606
  USPC ................. 320/128, 134–136, 164
  See application file for complete search history.

(56) References Cited

U.S. PATENT DOCUMENTS

| | | | |
|---|---|---|---|
| 5,617,007 A | * | 4/1997 | Keidl et al. ............ 320/141 |
| 2005/0134221 A1 | * | 6/2005 | Wanibuchi et al. ............ 320/128 |

| | | | |
|---|---|---|---|
| 2007/0013344 A1 | | 1/2007 | Aradachi et al. |
| 2010/0052617 A1 | | 3/2010 | Aridome et al. |
| 2011/0112782 A1 | | 5/2011 | Mjima et al. |

FOREIGN PATENT DOCUMENTS

| | | |
|---|---|---|
| CN | 102084262 | 6/2011 |
| JP | H10-145979 | 5/1998 |
| JP | H10-145981 | 5/1998 |
| JP | 2001-228226 | 8/2001 |
| JP | 2007-24541 | 2/2007 |
| JP | 2007-78506 | 3/2007 |
| JP | 2008-123961 | 5/2008 |
| JP | 2010-60408 | 3/2010 |
| JP | 2011-15481 | 1/2011 |

OTHER PUBLICATIONS

Chinese Office Action and Search Report dated Apr. 25, 2014 issued in a corresponding Chinese application No. 201210333549.3 and the English translations thereof.

* cited by examiner

*Primary Examiner* — Nghia Doan
(74) *Attorney, Agent, or Firm* — Renner, Otto, Boisselle & Sklar, LLP

(57) ABSTRACT

A charger includes an output circuit unit to output a charging current to a secondary battery, a voltage detection unit to detect a voltage of the secondary battery, and a control unit to control the output circuit unit, whereby constant current charging and constant voltage charging are performed. The control unit decreases a constant current value of the charging current by stages during the constant current charging and determines that the secondary battery has deteriorated by using a first voltage drop value of the secondary battery occurring upon first conversion and a second voltage drop value of the secondary battery occurring upon second conversion.

16 Claims, 3 Drawing Sheets

CHARGER APPARATUS CAPABLE OF DETERMINING DETERIORATION OF SECOND BATTERY

FIELD OF THE INVENTION

The present invention relates to a charger.

BACKGROUND OF THE INVENTION

Conventionally, a secondary battery has been used as a power source for a variety of types of a portable device or the like. As the number of charge and discharge cycles of a secondary battery increases, the discharge capacity thereof decreases. Accordingly, charging times of the secondary battery repeatedly used are limited. For this reason, some chargers that charge secondary batteries are configured to determine life spans of the secondary batteries when charging them.

This type of the charger includes a charging device that includes a battery voltage detection circuit configured to detect a battery voltage of a battery pack provided with a secondary battery and battery voltage gradient calculation means configured to calculate a battery voltage gradient based on the detected battery voltage and a battery voltage before a predetermined time (see, e.g., Japanese Patent Application Publication No. 2007-24541 (JP2007-24541A)).

If the voltage of the battery pack before the initiation of charging is equal to or lower than a predetermined voltage value and a battery voltage gradient within a predetermined time period after the initiation of charging is equal to or greater than a first predetermined value, the charging device disclosed in JP2007-24541A determines that the life span of the secondary battery has reached its end. Further, the charging device includes an LED which displays the status of life span deterioration of the battery pack.

Accordingly, the charging device is capable of determining the life span of the secondary battery and notifying a user of the deterioration status of the secondary battery in a simple manner.

Further, a battery deterioration measuring device that measures deterioration of a battery cell, i.e., a secondary battery, is known for including a voltage measurement unit configured to measure a voltage of battery cell, a current measurement unit configured to measure a charging current of the battery cell, and a control unit configured to measure the deterioration rate of the battery cell (see, e.g., Japanese Patent Application Publication No. 2008-123961 (JP2008-123961A)).

If the value of a charging current being supplied during the constant current charging of the battery cell is a first charging current value, the battery deterioration measuring device disclosed in JP2008-123961A obtains a first cell voltage from the voltage value measured by the voltage measurement unit.

Further, if the value of the charging current is changed to a second charging current value smaller than the first charging current value, the battery deterioration measuring device obtains a second cell voltage from the voltage value measured by the voltage measurement unit. Furthermore, in the battery deterioration measuring device, the control unit calculates an internal resistance of the battery cell based on the first cell voltage and the second cell voltage to determine the deterioration rate of the battery cell.

Therefore, according to JP2008-123961A, the batter deterioration measuring device may accurately determine the deterioration of the secondary battery to charge the secondary battery.

Meanwhile, there is a variety of secondary batteries, including a secondary battery whose internal resistance is high in an initial phase in which charging times of the secondary battery is small, and a secondary battery whose internal resistance is low in the initial phase, depending on the types or differences of secondary batteries. Moreover, the voltage of the secondary battery before the initiation of charging considerably varies depending on the remaining capacity of the secondary battery to be charged.

However, since the charging device described in JP2007-24541A uses the voltage before the initiation of charging to determine the life span, the possibility of erroneous determination may be increases because of the type or the remaining capacity of the secondary battery. In addition, the battery deterioration measuring device described in JP2008-123961 needs to accurately measure the charging current and voltage of the secondary battery and to calculate the internal resistance, and accordingly, there is a possibility of measurement errors.

SUMMARY OF THE INVENTION

In view of the above, the present invention provides a charger capable of more accurately determining the deterioration of the secondary battery regardless of a type of a secondary battery or a remaining capacity of the secondary battery before the initiation of charging.

In accordance with an aspect of the present invention, there is provided a charger including an output circuit unit configured to output a charging current to a secondary battery, a voltage detection unit configured to detect a voltage of the secondary battery, and a control unit configured to control the output circuit unit, whereby constant current charging, in which the charging current is flows at a constant current, and constant voltage charging, in which the charging current flows at constant voltage after the constant current charging, are performed.

The control unit decreases a constant current value of the charging current by stages during the constant current charging and determines that the secondary battery has deteriorated by using a first voltage drop value of the secondary battery that occurs upon first conversion in which the constant current value is converted and a second voltage drop value of the secondary battery that occurs upon second conversion in which a constant current value which is different from that of the first conversion is converted.

A memory device may be provided in a battery pack including the secondary battery, and the control unit stores numbers of charging times of the secondary battery and the first and the second voltage drop values of the secondary battery corresponding to the numbers of charging times in the memory device. The control unit compares the first and the second voltage drop values in an initial phase in which the number of charging times of the secondary battery is equal to or smaller than a predetermined value with the first and the second voltage drop values in a phase in which the number of charging times of the secondary battery is greater than that in the initial phase to exclude a deviation in first and second voltage drop values of secondary batteries of respective battery packs in the initial phase.

The charger may further include a notification unit configured to provide a result of the determination to an outside.

The charger in accordance with the embodiment of the present invention is capable of more accurately determining the deterioration of the secondary battery regardless of the type of secondary battery or the remaining capacity of the secondary battery before the initiation of charging.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

First Embodiment

Figure 1:
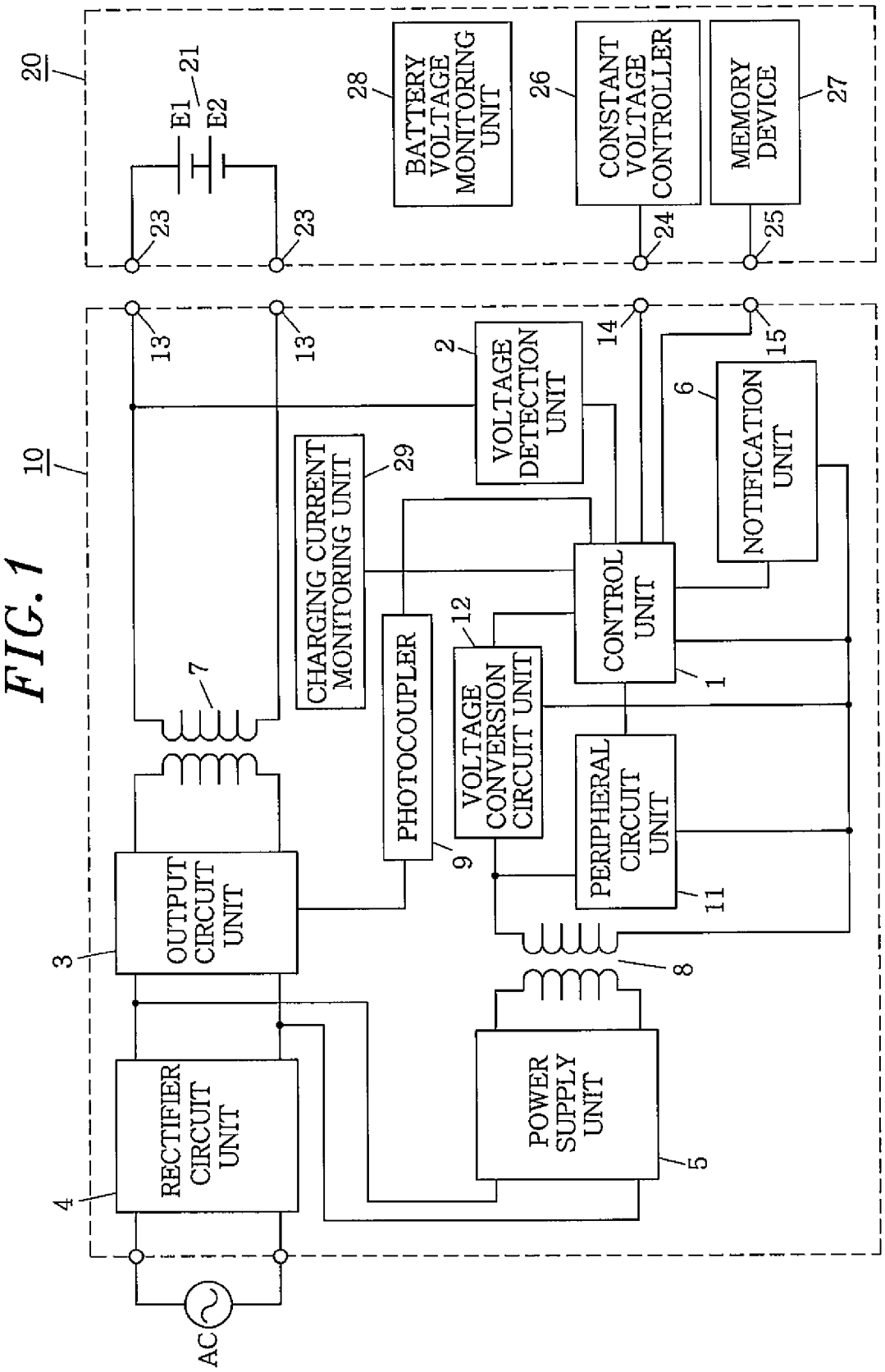
FIG. 1 is a block diagram showing a charger in accordance with a first embodiment and a battery pack connected to the charger.
Figure 2:
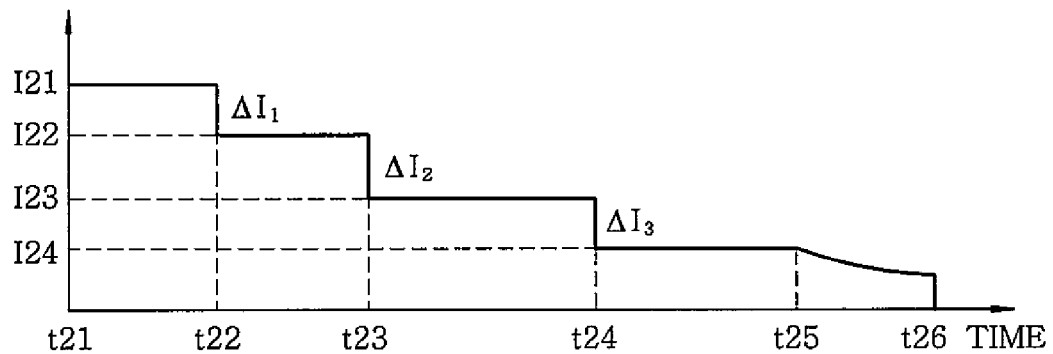
FIG. 2 is a diagram illustrating charging current characteristics of a secondary battery charged by the charger.
Figure 3:
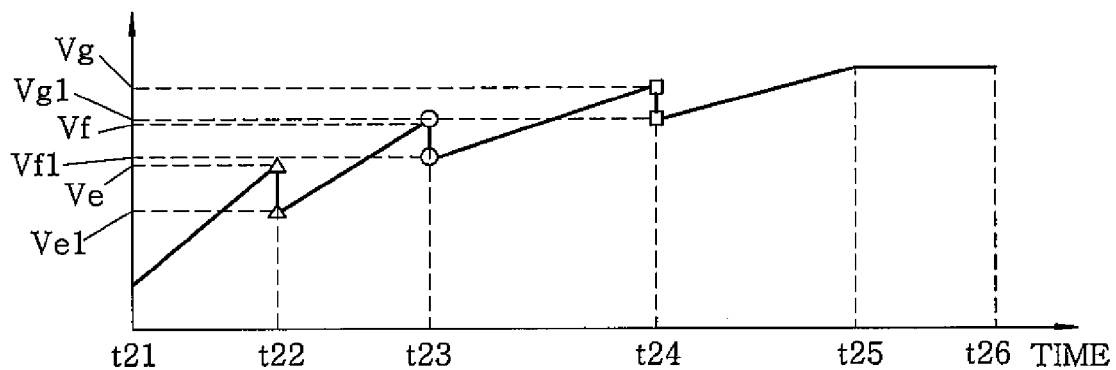
FIG. 3 is a diagram illustrating battery voltage characteristics of the secondary battery is charged by the charger.

Referring to FIGS. 1 to 3, a charger 10 and a battery pack 20 connected thereto in accordance with the present embodiment will be described. The same reference numerals will be used to designate the same components throughout the drawings, and redundant descriptions thereof will be omitted.

The charger 10 in accordance with the present embodiment, as shown in FIG. 1, charges a secondary battery 21 using an external power source AC such as a commercial power source or the like. The secondary battery 21 is contained in the battery pack 20 that can be detachably attached to the housing (not shown) of the charger 10. Two small batteries E1 and E2 that are electrically connected in series are used as the secondary battery 21.

The charger 10 in accordance with the present embodiment includes an output circuit unit 3 for outputting a charging current to the secondary battery 21 and a voltage detection unit 2 for detecting a voltage of the secondary battery 21. The charger 10 further includes a control unit 1 that controls the output circuit unit 3 so that the output circuit unit 3 performs constant current charging to flow the charging current at a constant current and constant voltage charging to flow a charging current at a constant voltage after the constant current charging, as shown in FIGS. 2 and 3.

The control unit 1 decreases the constant current value of the charging current in a stepwise manner during constant current charging, and determines whether or not the secondary battery 21 has deteriorated by using a first voltage drop value of the secondary battery 21 that is obtained upon first conversion in which the constant current value is converted and a second voltage drop value of the secondary battery 21 that is obtained upon second conversion in which a constant current value different from that of the first conversion is converted. The control unit 1 increases the accuracy of the determination whether or not the secondary battery 21 has deteriorated based on the first and second voltage drop values. The charger 10 in accordance with the present embodiment includes a notification unit 6 notifying of the determination result.

First, the fundamental operation of the charger 10 in accordance with this embodiment will be described with reference to FIGS. 4 to 6.

Figure 4:
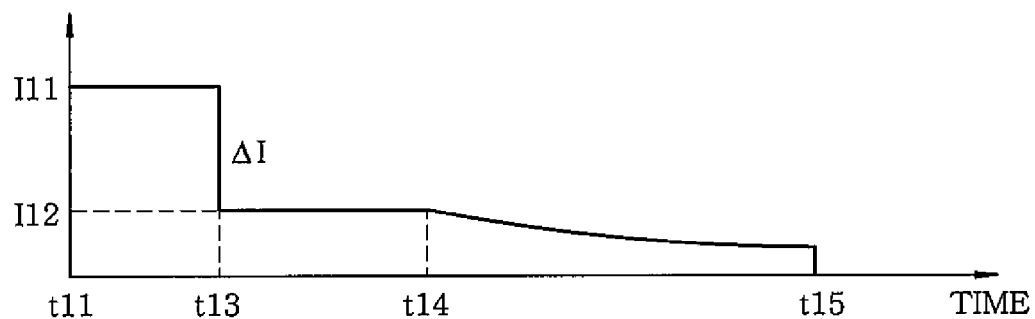
FIG. 4 is a diagram illustrating basic charging current characteristics of a secondary battery charged by the charger.
Figure 5:
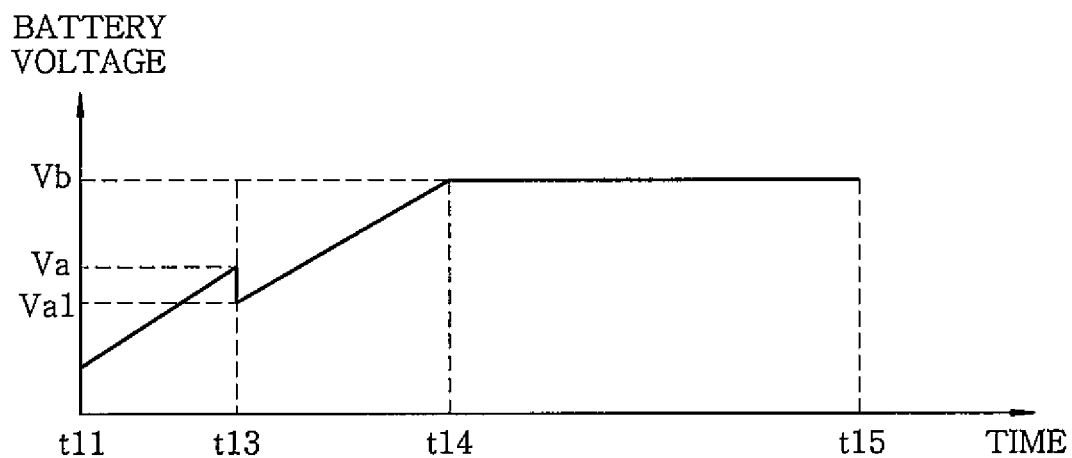
FIG. 5 is a diagram illustrating basic battery voltage characteristics of the secondary battery charged by the charger.

The charger 10, as shown in FIG. 4, flows a charging current into the secondary battery 21 at constant current at time t11 at which charging is initiated. Then, the charger switches from constant current charging to constant voltage charging at time t14 (refer to FIG. 5) in such a way that the control unit 1 controls the output circuit unit 3 based on a signal from a constant voltage controller 26 (which will be described later) of the battery pack 20. When the voltage of the secondary battery 21 reaches a specific voltage, e.g., the reference voltage Vb in FIG. 5, the constant voltage controller 26 transmits a corresponding signal to the control unit 1 to switch from the constant current charging to the constant voltage charging, based on a signal from a battery voltage monitoring unit 28 which is provided in the battery pack 20 to monitor the voltage of the secondary battery 21. That is, the charger 10 performs constant current charging during the period between time t11 and time t14. When the secondary battery 21 is charged during constant current charging in the charger 10, the voltage of the secondary battery 21 gradually increases. The voltage of the secondary battery 21 drops from voltage Va to voltage Va1 at time t13 at which the charging current value is changed from a constant current value I11 to a constant current value I12 during constant current charging.

Further, the charger 10 performs constant voltage charging in which a charging current flows into the secondary battery 21 at constant voltage during the period between time t14 and time t15, which comes after the constant current charging. Furthermore, when the secondary battery 21 is charged during constant voltage charging in the charger 10, the charging current flowing into the secondary battery 21 gradually decreases. In the charger 10, the control unit 1 determines that the secondary battery 21 has been fully charged based on a signal from a charging current monitoring unit 29 provided in the charger 10 and stops the charging of the secondary battery 21 at time t15.

In other words, the charger 10 in accordance with the present embodiment charges the secondary battery 21 by performing constant current charging and constant voltage charging to which the constant current charging has switched after the completion thereof. Accordingly, the charger 10 does not allow overcharging of the secondary battery 21 which may easily occur when only constant current charging is performed, while reducing the time taken to charge the secondary battery 21 compared to performing charging only by constant voltage charging.

Meanwhile, in the secondary battery 21, a representative of which is a lithium ion secondary battery (hereinafter also referred to as a "lithium secondary battery"), when the charging times of the secondary battery 21 increases, an electrical characteristics of the charge or discharge of the secondary battery 21 tend to deteriorate due of an increase in internal resistance or the like. For this reason, the electrical characteristics of the secondary battery 21 in an initial phase in which the charging times of the secondary battery 21 is small are different from those of the deteriorated secondary battery 21 in a phase in which the charging times of the secondary battery 21 is great.

Figure 6:
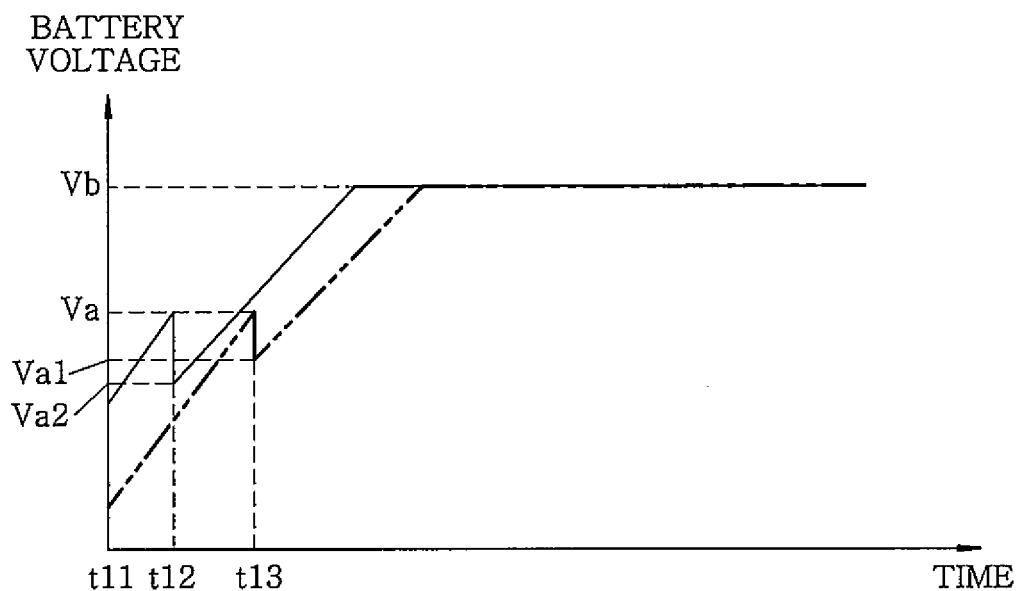
FIG. 6 is a diagram illustrating basic electrical characteristics of the secondary battery that is detected by the charger.

As the number of the charging times increases, e.g., as shown in FIG. 6, the electrical characteristics of the secondary battery 21 during constant current charging are changed from the electrical characteristics of the secondary battery 21 in the initial phase (e.g., the dashed dotted line in FIG. 6) to the electrical characteristics of the deteriorated secondary battery 21 (e.g., the solid line in FIG. 6).

In the secondary battery 21 in the initial phase, the battery voltage of the secondary battery 21 becomes voltage Va at time t13 during the constant current charging with a constant current value I11. The control unit 1 in the charger 10 controls the output circuit unit 3, so that the constant current value is decreased from the constant current value I11 to the constant current value I12 at time t13 at which the battery voltage of the secondary battery 21 has become voltage Va, as shown in FIG. 4. The secondary battery 21 in the initial phase exhibits the characteristic in which a voltage drop occurs by a voltage drop value (Va−Va1) when the constant current value of the charging current changes from the constant current value I11 to the constant current value I12.

In contrast, in the deteriorated secondary battery 21, the battery voltage of the secondary battery 21 becomes voltage Va at time t12 during the constant current charging with the constant current value I11. The control unit 1 in the charger 10 controls the output circuit unit 3, so that the constant current value is decreased from constant current value I11 to constant current value I12 at time t12 at which the battery voltage of the secondary battery 21 has become voltage Va. The deteriorated secondary battery 21 exhibits the characteristic in which a voltage drop occurs by a voltage drop value (Va−Va2), when the constant current value of the charging current changes from the constant current value I11 to the constant current value I12. For this reason, the voltage drop value of the deteriorated secondary battery 21 tends to increase compared to the voltage drop value of the secondary battery 21 in the initial phase as shown in FIG. 6.

In the charger 10 in accordance with the present embodiment, voltage Va is set as a predetermined first voltage in advance. Further, the control unit 1 calculates the value of a voltage drop from voltage Va to voltage Va2 at time t12, when voltage Va is detected. Furthermore, the charger 10 in accordance with the present embodiment is not limited to the configuration in which the control unit 1 calculates the voltage drop value based on a preset voltage. That is, in the charger 10 in accordance with the present embodiment, the battery voltage of the secondary battery 21 is measured at every preset time and the voltage drop value is calculated at the preset time.

In the charger 10, the control unit 1 may determine that the secondary battery 21 has deteriorated if the value of the voltage drop occurring when the constant current value is changed during the constant current charging is equal to or larger than a preset value. Since the charger 10 determines that the secondary battery 21 has deteriorated by using the value of the voltage drop occurring when the current value is changed during the constant current charging, it can determine whether or not the secondary battery 21 has deteriorated regardless of the type of secondary battery 21 or the remaining capacity of the secondary battery 21 before the initiation of charging. In other words, the charger 10 functions as a battery deterioration determination device that determines whether or not the secondary battery 21 has deteriorated by using the characteristic of the voltage drop value during the constant current charging of the secondary battery 21.

In this case, in the charger 10, if the voltage drop value attributable to the deterioration of the secondary battery 21 is very small in the initial phase, there is concern about decrease in the accuracy of the determination of whether or not the secondary battery 21 has deteriorated due to a detection error of the voltage detection unit 2. The charger 10 in accordance with the present embodiment decreases the constant current value of charging current during constant current charging in a stepwise manner, and performs calculation using a plurality of values of voltage drops occurring when the constant current values are changed, thereby increasing the accuracy of the determination of whether or not the secondary battery 21 has deteriorated. The charger 10 in accordance with the present embodiment can increase the accuracy of the determination of whether the secondary battery 21 has deteriorated by using an average of two values of voltage drops, i.e., a first voltage drop value and a second voltage drop value.

The configuration of the charger 10 in accordance with the present embodiment will be described in detail below.

The battery pack 20 is mounted to the housing of the charger 10, so that the charger 10 is electrically connected to the battery pack 20, and the secondary battery 21 can be charged by converting a power from the external power source AC and supplying the converted power to the secondary battery 21. The charger 10 includes a rectifier circuit unit 4 which is electrically connected to the external power source AC. The rectifier circuit unit 4, although now shown, includes, e.g., a diode bridge circuit, to which the external power source AC is connected via a fuse. Further, a rectifier circuit unit 4 may be configured such that a smoothing capacitance is connected between output terminals of a diode bridge circuit and the smoothing capacitance smoothes a DC voltage rectified by the diode bridge circuit.

In the charger 10, an output circuit unit 3 that outputs a charging current to the secondary battery 21 is electrically connected to the output terminals of the rectifier circuit unit 4. Further, in the charger 10, an output terminal of the output circuit unit 3 is connected to a primary side of a first isolation transformer 7 for the charging of the secondary battery. In the charger 10, a secondary side of the first isolation transformer 7 is connected to a pair of terminals 13. The charger 10 is configured such that the terminals 13 of the charger 10 are electrically connected to terminals 23 electrically connected to the secondary battery 21 contained in the battery pack 20.

Further, although the charger 10 is configured such that the terminals 13 of the charger 10 are electrically and mechanically connected to the terminals 23 of the battery pack 20 in a direct manner, the charger 10 is not limited thereto. The charger 10 and the battery pack 20 may be electrically connected without a mechanical contact using an isolation transformer (not shown) or the like. That is, the charger 10 has a configuration capable of non-contact charging.

The charger 10 rectifies the AC voltage from the external power source AC by using the rectifier circuit unit 4, converts the rectified AC voltage into a predetermined voltage via the output circuit unit 3 and the first isolation transformer 7, and then outputs the converted voltage from the terminal 13 to the battery pack 20. Accordingly, the charger 10 may supply a charging current to the battery pack 20 of the secondary battery 21 as a DC constant voltage power source.

The output circuit unit 3 functions as an output control unit that controls the supply and cutoff of a power to the first isolation transformer 7 or controls the amount of current flowing through the first isolation transformer 7. The output circuit unit 3 is connected to the control unit 1 via a photo-coupler 9. The control unit 1 is electrically connected to the voltage detection unit 2 that is provided on the secondary side of the first isolation transformer 7.

The control unit 1 may include a CPU (Central Processing Unit) such as a microprocessor or the like capable of executing predetermined calculation processing. Further, the control unit 1 includes a memory unit that stores a predetermined value to be compared with a voltage drop value in order to determine whether or not the secondary battery 21 has deteriorated.

Further, the control unit 1 includes, as a storage unit, a ROM (Read Only Memory) which is a nonvolatile semiconductor device storing a predetermined control program therein. The control unit 1 includes an AD converter which converts the signal of a voltage detected by the voltage detection unit 2 into a digital value. The control unit 1 outputs a control signal to the output circuit unit 3 via the photocoupler 9 by executing the control program stored in the ROM, thereby controlling the operation of charging the secondary battery 21.

The voltage detection unit 2 is, e.g., a circuit that detects a voltage between the terminals 13 to which the secondary battery 21 is electrically connected and is configured in that the circuit in which, two resistors have been connected in series, is connected between the terminals 13 in parallel. The voltage detection unit 2 outputs a voltage resulting from a voltage drop of the resistors to the control unit 1 as a voltage of the secondary battery 21.

The output circuit unit 3 includes a switching element formed with, e.g., an MOS transistor, and the switching element is controlled to be turned on/off in response to a PWM signal transmitted from the control unit 1 as a control signal. That is, the switching frequency and "ON" time of the switching element is controlled based on PWM signal. In the charger 10, the control unit 1 outputs a control signal based on the detection result of the voltage detection unit 2, and the switching element of the output circuit unit 3 is operated in response to the PWM signal, i.e., the control signal, so that a desired charging current is outputted to the battery pack 20.

Further, a power supply unit 5 for the control unit 1 is electrically connected to the output terminals of the above-described rectifier circuit unit 4. The AC voltage of the external power source AC is rectified by the rectifier circuit unit 4, and then applied to the power supply unit 5. The power supply unit 5 adjusts a current or a voltage to be supplied to the control unit 1 so that it functions as a power source to operate the control unit 1. The output terminals of the power supply unit 5 are electrically connected to the primary side of a second isolation transformer 8 for the control unit 1.

A peripheral circuit unit 11 that includes a cooling fan (not shown) configured to cool the charger 10 or a circuit block that controls the operation of the cooling fan (not shown) is connected to the secondary side of the second isolation transformer 8. The peripheral circuit unit 11 is electrically connected to the control unit 1 so that the circuit block, which controls the operation of the cooling fan, can be controlled. Further, at the secondary side of the second isolation transformer 8, a voltage conversion circuit unit 12 is connected to an output terminal of the second isolation transformer 8. The voltage conversion circuit unit 12 is electrically connected to the control unit 1 to stabilize a voltage inputted to the control unit 1. The voltage conversion circuit unit 12 is, e.g., a series regulator configuring a DC power source of a constant voltage, and may be formed of a three-terminal regulator or the like.

That is, a power is supplied to the control unit 1 from the power supply unit 5 electrically connected to the output terminal of the rectifier circuit unit 4 via the second isolation transformer 8 and the voltage conversion circuit unit 12. Further, at the secondary side of the second isolation transformer 8, a notification unit 6 that is connected to the control unit 1 to provide notification of the determination result obtained by the control unit 1 to the outside is provided.

Further, the notification unit 6 may include, e.g., a display unit, such as an LED (Light Emitting Diode) or an organic EL (ElectroLuminescence) device, a speaker or a buzzer. When the notification unit 6 includes an LED therein, the notification unit 6 appropriately contains a limiting resistor that limits current flowing through the LED. The notification operation of the notification unit 6 is controlled by the control unit 1. The notification unit may provide notification of the results of the determination made that the secondary battery 21 has deteriorated to the outside in response to a signal from the control unit 1.

Further, the charger 10 includes the charging current monitoring unit 29 for monitoring the charging current to the secondary battery 21. The control unit 1 monitors, by using the charging current monitoring unit 29, the charging current of the secondary battery 21 to determine whether or not the charging current is reduced to a specific threshold value (minimum physical amount for charging) or less during a constant voltage charging. When the charging current is reduced to the specific threshold value or less, the control unit 1 stops the charging of the secondary battery 21.

The battery pack 20 connected to the charger 10 in accordance with the present embodiment will be described in further detail below.

The two small batteries E1 and E2 electrically connected in series, as shown in FIG. 1, are contained as the secondary battery 21 in the battery pack 20 which is charged by the charger 10 in accordance with the present embodiment. Further, the secondary battery 21 is not limited to the two small batteries E1 and E2 electrically connected in series. The secondary battery 21 may be two small batteries E1 and E2 which are electrically connected in parallel, or a single small battery. Furthermore, the secondary battery 21 may be three or more small batteries which are appropriately electrically connected in series, in parallel, or in series-parallel. The secondary battery 21 charged by the charger 10 in accordance with the present embodiment may be, e.g., a nickel-hydrogen secondary battery or a lithium secondary battery.

Although the use of the secondary battery 21 charged by the charger 10 is not particularly limited, the secondary battery 21 may be put in, e.g., an electric power tool (not shown) as a power source therefor. When the secondary battery 21 is installed to be used as the power source for an electric power tool, it is preferable to use a battery pack 20 including a housing (not shown) which is configured to be put in the electric power tool and accommodate the secondary battery 21 therein.

A memory device 27 on which data is rewritable from the outside is provided in the battery pack 20. The memory device 27 may store the number of the charging times of the secondary battery 21 and the voltage drop values corresponding to the number of the charging times of the secondary battery 21. Under the control of the control unit 1, the memory device 27 may store the number of charging times of the secondary battery 21 and the voltage drop values of the secondary battery 21 corresponding thereto so that the voltage drop values are associated with the number of charging times of the secondary battery 21.

The memory device 27 may not only store the number of charging times of the secondary battery 21 and the voltage drop values corresponding thereto, but may also store a battery voltage in the case in which the secondary battery 21 has been fully charged, a discharge completion voltage that is used to prevent overdischarging of the secondary battery 21, a threshold value of the charging current that is used to prevent overcharging, the reference voltage Vb, a control voltage for constant voltage and the like. Further, the memory device 27 may be configured with, e.g., a nonvolatile semiconductor device and the like such as an EEPROM (Electrically Erasable and Programmable Read Only Memory) or the like.

Further, the battery pack 20 is provided with a constant voltage controller 26 that keeps the voltage of the secondary battery 21 to be constant during the constant voltage charging of the secondary battery 21. The constant voltage controller 26 may be configured with, e.g., a control IC or the like. In the charger 10 in accordance with the present embodiment, during the charging of the secondary battery 21, a terminal 24 of the battery pack 20 that is electrically connected to the constant voltage controller 26 is connected to a terminal 14 of the charger 10 that is electrically connected to the control unit 1. Next, the operation of the charger 10 in accordance with the present embodiment will be described in detail below.

The charger 10 in accordance with the present embodiment initiates charging when the terminals 23 of the battery pack 20 which are connected to the secondary battery are electrically connected to the terminals 13 of the charger 10. First, the charger 10 performs constant current charging in which the control unit 1 controls the output circuit unit 3 so that the output circuit unit 3 allows a charging current to flow into the secondary battery 21 at a constant current. The charger 10 measures a voltage applied to the secondary battery 21 by using the voltage detection unit 2 during the constant current charging. The charger 10 in accordance with the present embodiment decreases the constant current value of the charging current in a stepwise manner during constant current charging.

The charger 10 in accordance with the present embodiment decreases the constant current value of the charging current in a stepwise manner as the charging of the secondary battery 21 proceeds during the constant current charging, and thus, mitigates the deterioration of the secondary battery 21 by preventing overcharge or the like. Further, the charger 10 in accordance with the present embodiment can more accurately determine whether the secondary battery 21 has deteriorated.

The charger 10 in accordance with the present embodiment, the control unit 1 controls the output circuit unit 3 so that the charging of the secondary battery 21 is initiated and constant current charging is performed to flow a charging current at a constant current value I21 during the period from time t21 to time t22, i.e., the period immediately after the initiation of charging. Further, the charger 10 decreases the current value of the charging current from the constant current value I21 to a constant current value I22 at time t22, and then performs constant current charging during the period from time t22 to time t23. In the same manner, the charger 10 decreases the current value of the charging current from the constant current value I22 to a constant current value I23 at time t23, and then performs constant current charging during the period from time t23 to time t24. Moreover, the charger 10 decreases the current value of the charging current from the constant current value I23 to a constant current value I24 at time t24. Then, the charger 10 switches from constant current charging to constant voltage charging at time t25 in such a manner that the control unit 1 controls the output circuit unit 3 based on a signal from the constant voltage controller 26 of the battery pack 20. The charger 10 performs constant voltage charging during the period from time t25 to time t26.

At respective times t22 to t24 in FIG. 2, decreasing values ΔI1, ΔI2 and ΔI3 of the constant currents, which decrease by stages, may be same or different from each other.

That is, the charger 10 performs constant current charging while decreasing the charging current in a stepwise manner during the period from time t21 to time t25, and switches to constant voltage charging by controlling the output circuit unit 3 by the control unit 1. In the charger 10, the control unit 1 determines that the secondary battery has been fully charged based on the signal from the charging current monitoring unit 29 and stops the charging of the secondary battery 21 at time t26.

The charger 10 in accordance with the present embodiment uses the value of voltage drop of the secondary battery 21, which is detected by the voltage detection unit 2 immediately before changing the constant current value to determine whether or not the secondary battery 21 has deteriorated during constant current charging in which the constant current value of the charging current is decreased in a stepwise manner. The charger 10 measures the voltage of the secondary battery 21 by using the voltage detection unit 2 during the constant current charging.

Further, the control unit 1 determines whether or not the voltage detected by the voltage detection unit 2 has reached a predetermined first voltage Ve stored in the memory unit of the control unit 1 in advance. The control unit 1 maintains the constant current charging at the constant current value I21 until the voltage of the secondary battery 21 detected by the voltage detection unit reaches the preset voltage Ve (at t22). If it is determined that the voltage detected by the voltage detection unit 2 is equal to the voltage Ve, the control unit 1 decreases the constant current value of the charging current from the constant current value I21 to the constant current value I22 and then performs constant current charging. Herein, the voltage of the secondary battery 21 is decreased from the voltage Ve to a voltage Ve1 by decreasing the constant current value of the charging current.

The charger 10 detects the voltage Ve immediately before a voltage drop of the secondary battery 21 and the voltage Ve1, i.e., the minimum voltage value after the voltage drop, and stores them in the memory unit of the control unit 1.

Next, the charger 10 continues the constant current charging and determines whether or not the voltage detected by the voltage detection unit 2 has reached a predetermined voltage Vf, which was stored in the memory unit of the control unit 1 in advance, during constant current charging. The control unit 1 maintains the constant current charging at the constant current value I22 until the voltage of the secondary battery 21 detected by the voltage detection unit reaches the preset voltage Vf (at t23). If it is determined that the voltage detected by the voltage detection unit 2 is equal to the voltage Vf, the control unit 1 decreases the constant current value of the charging current from the constant current value I22 to the constant current value I23, and then performs constant current charging.

Herein, the voltage of the secondary battery 21 is decreased from the voltage Vf to a voltage Vf1 by decreasing the constant current value of the charging current. The charger 10 detects the voltage Vf immediately before the voltage drop of the secondary battery 21 and a voltage Vf1, i.e., the minimum voltage value after the voltage drop and stores them in the memory unit of the control unit 1.

In the same manner, the charger 10 maintains the constant current charging at the constant current value I23 until the voltage detected by the voltage detection unit 2 reaches a voltage Vg (at t24), which was set in the control unit 1 in advance, during the constant current charging. If it is determined that the voltage detected by the voltage detection unit 2 is equal to voltage Vg, the control unit 1 decreases the current value of the charging current from the constant current value I23 to a constant current value I24 and then performs constant current charging. Thereafter, the control unit 1 switches from the constant current charging to constant voltage charging at time t25 based on a signal from the constant voltage controller 26 provided in the battery pack 20. Further, the charger 10 determines that the secondary battery 21 has been fully charged based on the signal from the charging current monitoring unit 29, and the control unit 1 stops the charging of the secondary battery 21 at time t26.

Next, control unit 1 calculates, by using a control program, a first voltage drop value (Ve–Ve1) of the secondary battery 21 that occurs upon first conversion in which a constant current value is converted and stores it in the memory unit of the control unit 1. In the same manner, the control unit 1 calculates, by the control program, the second voltage drop value (Vf–Vf1) of the secondary battery that occurs upon second conversion in which a constant current value that is different from the constant current value converted in the first conversion is converted, and stores it in the memory unit of the control unit 1.

Further, the charger 10 outputs the first voltage drop value and the second voltage drop value, as the voltage drop values, from the control unit 1 to the memory device 27 of the battery pack 20 through the terminals 15 and 25.

The control unit 1 stores the number of charging times of the secondary battery 21 and the voltage drop value corresponding to the number of charging times of the secondary battery 21. The control unit 1 may store, e.g., the number of charging times, which is obtained by adding one to the number of charging times, which was stored in the memory device 27 just before, in the memory device 27 whenever charging is performed.

Thereafter, the control unit 1 of the charger 10 in accordance with the present embodiment calculates, e.g., the ratio (Ve–Ve1)/(Vf–Vf1) of the first voltage drop value (Ve–Ve1) indicated between the triangular symbols of FIG. 3 to the second voltage drop value (Vf–Vf1) indicated between the circular symbols of FIG. 3.

Then, the control unit 1 of the charger 10 compares a predetermined value stored in the memory unit of the control unit 1 in advance with a ratio between the values of voltage drops (Ve–Ve1)/(Vf–Vf1) calculated by the control unit 1. In a case, e.g., where $\Delta I_1$ (i.e., I22–I21) is greater than $\Delta I_2$ (i.e., I23–I22), the charger 10 in accordance with the embodiment determines that the secondary battery 21 has deteriorated if the calculated ratio between the values of voltage drops (Ve–Ve1)/(Vf–Vf1) is equal to or larger than the predetermined value stored in advance. If the charger 10 in accordance with the present embodiment determines that the secondary battery 21 has deteriorated, the control unit 1 controls the notification unit 6 so that the notification unit 6 provides notification of the determination result to the outside.

In the charger 10 in accordance with the present embodiment, the control unit 1 calculates a plurality of voltage drop values and a ratio between voltage drop values, and determines whether or not the secondary battery 21 has deteriorated based on the ratio between the voltage drop values. Since the charger 10 in accordance with the present embodiment determines whether or not the secondary battery 21 has deteriorated by using the ratio between the voltage drop values, the size of the deviation in the voltage drop values of secondary batteries 21 of respective battery packs is reduced, and thus the accuracy of the determining whether the secondary battery 21 has deteriorated can be increased.

Further, although the charger 10 in accordance with the present embodiment defines "Ve–Ve1" as the first voltage drop value and "Vf–Vf1" as the second voltage drop value, the first and second voltage drop values are not limited thereto. Accordingly, the charger 10 may define, e.g., "Vf–Vf1" as the first voltage drop value and voltage drop value "Vg–Vg1", which is indicated between the square symbols in FIG. 3 and is calculated in the same manner as the first voltage drop value, as the second voltage drop value. The charger 10 may also define "Ve–Ve1" as the first voltage drop value, "Vf–Vf1" as the second voltage drop value, and "Vg–Vg1" as the third voltage drop value. In this case, the charger 10 may determine that the secondary battery 21 has deteriorated, e.g., if the average of the first voltage drop value (Ve–Ve1), the second voltage drop value (Vf–Vf1) and the third voltage drop value (Vg–Vg1) is equal to or larger than the predetermined value which has been previously stored in the memory unit of the control unit 1.

Further, the ratio between the second the second voltage drop value (Vf–Vf1) and the third voltage drop value (Vg–Vg1) may be compared with a predetermined value to determine the deterioration of the secondary battery 21 as well as the ratio between first voltage drop value (Ve–Ve1) and the second voltage drop value (Vf–Vf1). Furthermore, the average of two drop voltage values, e.g., first voltage drop value (Ve–Ve1) and the second voltage drop value (Vf–Vf1), may be compared with a predetermined value to determine the deterioration of the secondary battery 21.

If it determines that the secondary battery 21 has deteriorated, the charger 10 may control the control unit 1 so that the control unit 1 stops the charging of the secondary battery 21 or continues.

If the charger 10 continues the charging of the secondary battery 21, it performs constant voltage charging in which the charging current flows into the secondary battery 21 at constant voltage during the period from time t25, i.e., just after the constant current charging, to time t26. During the constant voltage charging, the control unit controls the output circuit unit 3 to apply a constant voltage, and thus, the charging current is decreased. The charger 10 determines that the secondary battery 21 has been fully charged based on the signal from the charging current monitoring unit 29 and stops the charging of the secondary battery 21.

In the present embodiment, the memory device 27 may further store information on the type of the secondary battery 21 and transmits the information to the control unit 1. The control unit 1 may set the voltages Ve, Vf and Vg, the decreasing values ΔI1, ΔI2 and ΔI3 of the constant currents and the like according to the received information on the type of the secondary battery 21.

Accordingly, the charger 10 in accordance with the present embodiment can more accurately determine whether or not the secondary battery 21 has deteriorated regardless of the type of secondary battery 21 or the remaining capacity of the secondary battery 21 before the initiation of charging.

Further, the battery capacity of the secondary battery 21 which has been determined to have deteriorated is lower than that of the secondary battery 21 in an initial phase. For this reason, the charger 10 in accordance with the present embodiment provides notification of whether or not the secondary battery 21 has a battery capacity that can operate an electric power tool, e.g., for a specific time period, to a user by providing notification of the deterioration of the secondary battery 21 by the notification unit 6. That is, since the charger 10 is provided with the notification unit 6, the charger 10 may provide notification of the deterioration of the secondary battery 21 to a user or the like, and a user may predict the working time by using an electric power tool including the battery pack 20.

Second Embodiment

Although the charger 10 in accordance with the present embodiment uses the voltage drop values during the constant current charging in the first embodiment without change, there is difference in that the charger 10 in accordance with the present embodiment determines whether or not the secondary battery 21 has deteriorated by excluding the deviation in the voltage drop values of the secondary batteries 21 of respective battery packs 20 in the initial phase in which the number of charging times of the secondary battery is smaller than a specific number.

Further, the charger 10 in accordance with the present embodiment and a battery pack 20 connected to the charger 10 have the same circuit configuration as the charger 10 and battery pack 20 in accordance with the first embodiment shown in FIG. 1. The charger 10 in accordance with the present embodiment is different from the charger 10 of the first embodiment in a control program of the control unit 1 that performs the calculation of a voltage drop value or the like. Herein, the same reference numerals are used to designate elements that are the same as those of the first embodiment, and descriptions thereof will be appropriately omitted.

A memory device 27 is provided in the battery pack 20 that has a secondary battery 21 and is charged by the charger 10 in accordance with the present embodiment. The control unit 1 stores, in the memory device 27, the number of charging times of the secondary battery 21 and the voltage drop value of the secondary battery 21 to be corresponded to the number of charging times. The control unit 1 of the charger 10 compares the voltage drop value in the initial phase (e.g., average voltage drop value in the initial phase) where the number of charging times is smaller than a specific number (e.g., 5), with voltage drop value in a phase in which the number of charging times of the secondary battery 21 is greater than that in the initial phase. Accordingly, the charger 10 in accordance with the present embodiment may exclude the deviation in the voltage drop values of the secondary batteries 21 of respective battery packs 20 in the initial phase.

The operation of the charger 10 in accordance with the present embodiment will be described below.

In the charger 10 in accordance with the present embodiment, the terminal 25 of the battery pack 20 that is electrically connected to the memory device 27 is connected to the terminal 15 of the charger 10 that is electrically connected to the control unit 1 during the charging of the secondary battery 21.

The battery pack 20 which is connected to the charger 10 stores a voltage drop value corresponding to the charging of the battery pack 20 that is performed before the shipment from a factory as the first charging. Further, the charger in accordance with the present embodiment stores the numbers of charging times of the secondary battery 21 and voltage drop value corresponding to each number of charging times in the memory device 27 of the connected battery pack 20, as illustrated, e.g., in Table 1:

TABLE 1

| Number of charging times | Voltage drop VR1 [mV] | Voltage drop VR2 [mV] |
|---|---|---|
| 1 | 200 | 300 |
| 100 | 300 | 400 |
| 200 | 400 | 500 |
| 300 | 500 | 600 |
| . | . | . |
| . | . | . |
| . | . | . |
| 1000 | 800 | 1000 |
| . | . | . |
| . | . | . |
| . | . | . |

The charger 10 in accordance with the present embodiment may apply, e.g., a correction coefficient according to the difference between a predetermined reference value and a voltage drop value in an initial phase, to the voltage drop value calculated in the same manner as in the first embodiment so that the deviation in the voltage drop values of the secondary batteries 21 of respective battery packs 20 in the initial phase can be reduced. Further, the charger 10 may add, e.g., the difference between the predetermined reference value ($V_R$) and the voltage drop value in an initial phase ($V_{a1i}$) to a voltage drop value after the initial phase ($V_{a2i}$) (i.e., $V_{a2i}+(V_R-V_{a1i})$) so that the deviation in the voltage drop values in the initial phase of the secondary batteries 21 of respective battery packs 20 can be reduced.

The charger 10 determines that the secondary battery 21 has deteriorated if the voltage drop value from which the deviation in the voltage drop values of the secondary batteries 21 of respective battery packs 20 in the initial phase has been excluded is equal to or greater than a preset value.

Moreover, the charger 10 may adjust the predetermined value (Th), which is used to determine the deterioration of the secondary battery 21, with respect to each battery pack 20 by considering the difference between the predetermined reference value ($V_R$) and the voltage drop value in an initial phase ($V_{a1i}$) (i.e., $Th=Th-(V_R-V_{a1i})$) so that the deviation in the voltage drop values of the secondary batteries 21 of respective battery packs 20 in the initial phase can be reduced.

In the above, the case, in which the correction coefficient is applied to one voltage drop value to reduce deviation in the voltage drop values in the initial phase and the resultant value is compared with the preset value to determine whether or not the secondary battery has been deteriorated, is described, it is not limited thereto. That is, a plurality of voltage drop values after the initial phase (e.g., the first and the second voltage drop values in the first embodiment) are compared with the voltage drop values in the initial phase (e.g., the first and the second voltage drop values in the initial phase) to exclude the deviation in the voltage drop values of the secondary battery 21 of respective battery packs 20 in the initial phase. Then, the ratio between or the average of the plurality of the voltage drop values are used to determine the deterioration of the secondary battery 21.

The control unit 1 of the charger 10 in accordance with the present embodiment determines whether the secondary battery 21 has deteriorated by comparing the a voltage drop value in an initial phase in which the number of charging times of the secondary battery 21 is equal to or smaller than a predetermined value stored in the memory device 27, with the value of a voltage drop in a phase in which the number of charging times of the secondary battery 21 is greater than that in the initial phase.

With this, in the charger 10 in accordance with the present invention, the memory device 27 is provided in each battery pack 20 and the voltage drop value corresponding to the number of charging times of the secondary battery 21 is detected, thereby excluding the deviation between secondary batteries 21, e.g., the difference between a secondary battery 21 whose internal resistance is higher than that in an initial phase and a secondary battery 21 whose internal resistance is lower than that in the initial phase. That is, the charger 10 in accordance with the present embodiment can exclude the deviation between the voltage drop values of the secondary batteries 21 of respective battery packs 20 in an initial phase, and can further increase the accuracy of the determination of whether or not the secondary battery 21 has deteriorated.

While the invention has been shown and described with respect to the embodiments, it will be understood by those skilled in the art that various changes and modification may be made without departing from the scope of the invention as defined in the following claims.

What is claimed is:

1. A charger, comprising:
   an output circuit unit configured to output a charging current to a secondary battery;
   a voltage detection unit configured to detect a voltage of the secondary battery; and
   a control unit configured to control the output circuit unit to carry out charging operations each of which includes a constant current charging and a constant voltage charging sequentially performed in that order,
   wherein, during the constant current charging, a level of the charging current is decreased stepwisely by plural current conversions and, during the constant voltage charging, the charging current flows at a constant voltage, and
   wherein the control unit determines whether or not the secondary battery has deteriorated depending on a result of comparing an index value and a predetermined threshold associated with a deteriorated secondary battery, the index value being obtained by using voltage drop values of the secondary battery that occur by two or more of the current conversions.

2. The charger of claim 1, wherein a memory device is provided in a battery pack including the secondary battery, and
   wherein the control unit stores, in the memory device, the voltage drop values corresponding to the two or more of the current conversions in an initial phase in which the number of charging times of the secondary battery is equal to or smaller than a predetermined number of charging times of the secondary battery and excludes a deviation between each of the voltage drop values in the initial phase and a reference voltage value thereof when obtaining the index value.

3. The charger of claim 2, further comprising a notification unit configured to provide a result of the determination to an outside of the charger.

4. The charger of claim 2, wherein the index value is a ratio between two voltage drop values corresponding to two of the current conversions.

5. The charger of claim 4, wherein the index value is a ratio between a first voltage drop value and a second voltage drop value.

6. The charger of claim 2, wherein the index value is an average of voltage drop values corresponding to the two or more of the current conversions.

7. The charger of claim 6, wherein the index value is an average of a first voltage drop value and a second voltage drop value.

8. The charger of claim 1, further comprising a notification unit configured to provide a result of the determination to an outside of the charger.

9. The charger of claim 1, wherein a memory device is provided in a battery pack including the secondary battery, and
   wherein the control unit is configured to control the output circuit unit such that the level of the charging current is determined based on information stored in the memory device, the information indicating a type of the secondary battery.

10. The charger of claim 1, wherein the index value is a ratio between two voltage drop values corresponding to two of the current conversions.

11. The charger of claim 10, wherein the index value is a ratio between a first voltage drop value and a second voltage drop value.

12. The charger of claim 1, wherein the index value is an average of voltage drop values corresponding to the two or more of the current conversions.

13. The charger of claim 12, wherein the index value is an average of a first voltage drop value and a second voltage drop value.

14. A charger, comprising:
    an output circuit unit configured to output a charging current to a secondary battery;
    a voltage detection unit configured to detect a voltage of the secondary battery; and
    a control unit configured to control the output circuit unit to carry out charging operations each of which includes a constant current charging and a constant voltage charging sequentially performed in that order,
    wherein, during the constant current charging, a level of the charging current is decreased stepwisely by plural current conversions and, during the constant voltage charging, the charging current flows at a constant voltage, and
    wherein the control unit determines that the secondary battery has deteriorated if a voltage drop value of the secondary battery, which is detected by the voltage detection unit upon one of the current conversions, is equal to or greater than a predetermined threshold associated with a deteriorated secondary battery
    wherein a memory device is provided in a battery pack including the secondary battery, and
    wherein the control unit stores, in the memory device, the voltage drop value corresponding to said one of the current conversions in an initial phase in which the number of charging times of the secondary battery is equal to or smaller than a a predetermined number of charging times of the secondary battery and excludes a deviation between the voltage drop value in the initial phase and a reference voltage value thereof when determining whether or not the secondary battery has deteriorated.

15. The charger of claim 14, further comprising a notification unit configured to provide a result of the determination to an outside of the charger.

16. The charger of claim 14, wherein a memory device is provided in a battery pack including the secondary battery, and
    wherein the control unit is configured to control the output circuit unit such that the level of the charging current is determined based on information stored in the memory device, the information indicating a type of the secondary battery.

* * * * *